(12) United States Patent
DuBrucq

(10) Patent No.: US 7,443,078 B1
(45) Date of Patent: Oct. 28, 2008

(54) PIEZO ACTION APPLIED

(75) Inventor: Denyse Claire DuBrucq, Cedarville, OH (US)

(73) Assignee: e3 Enterprises lp, Cedarville, OH (US)

( * ) Notice: Subject to any disclaimer, the term of this patent is extended or adjusted under 35 U.S.C. 154(b) by 140 days.

(21) Appl. No.: 11/113,472

(22) Filed: Apr. 25, 2005

(51) Int. Cl.
*H01L 41/08* (2006.01)

(52) U.S. Cl. .................. 310/328; 310/330; 310/331

(58) Field of Classification Search ............ 310/328, 310/330–332; 244/75 R, 215, 219
See application file for complete search history.

(56) References Cited

U.S. PATENT DOCUMENTS

| | | | | |
|---|---|---|---|---|
| 4,363,991 | A * | 12/1982 | Edelman | 310/316.01 |
| 4,519,751 | A * | 5/1985 | Beckman et al. | 417/322 |
| 4,545,553 | A * | 10/1985 | Finke et al. | 244/134 D |
| 5,374,011 | A * | 12/1994 | Lazarus et al. | 244/99.8 |
| 5,889,354 | A * | 3/1999 | Sager | 310/331 |
| 6,010,098 | A * | 1/2000 | Campanile et al. | 244/219 |
| 6,260,795 | B1 * | 7/2001 | Gay et al. | 244/16 |
| 6,359,374 | B1 * | 3/2002 | Dausch et al. | 310/330 |
| 6,375,127 | B1 * | 4/2002 | Appa | 244/215 |
| 6,429,573 | B2 * | 8/2002 | Koopmann et al. | 310/328 |
| 6,481,667 | B1 * | 11/2002 | Ho | 244/99.11 |
| 6,664,710 | B1 * | 12/2003 | Gottlieb et al. | 310/323.02 |
| 6,769,873 | B2 * | 8/2004 | Beauchamp et al. | 416/3 |
| 6,781,284 | B1 * | 8/2004 | Pelrine et al. | 310/330 |
| 6,981,409 | B2 * | 1/2006 | Huynh | 73/170.02 |
| 6,991,280 | B2 * | 1/2006 | McKnight et al. | 296/180.1 |
| 7,075,213 | B2 * | 7/2006 | Krill | 310/328 |
| 7,119,475 | B2 * | 10/2006 | Matsuzaki et al. | 310/316.01 |

* cited by examiner

Primary Examiner—Mark Budd

(57) ABSTRACT

This invention expands functions possible with electric equipment using charge contorting Piezo technology. We replace engines and motors with Piezo units. These power electric vehicles using nudging by Piezo strips to turn shafts or axles holding propellers or wheels. Ranges of speeds these electric air, land, and sea vehicles can go match that of gas-powered vehicles. The fuel is electrons, which are stored in circuits of rechargeable batteries laminated into their bodies and interior structure. Piezos nudge either radiating spokes or bars on squirrel cage attached to the shaft or axle rotating them at a range of speed in both directions and stopping that rotation. Steerage is achieved with Piezo trim tabs that, when charged, move the control surfaces as rudders in planes and ships, and elevators and ailerons in planes. These tabs with positive power applied change their position in one direction, and with negative power, in the other direction. Releasing gas into a section of a vehicle increases buoyancy. Piezo pumping the gas into a compressed air chamber lowers buoyancy. Using Helium for this in the aircraft allows balloon-type takeoffs and climbs. Ships with air replacing ballast water ride higher in the water. Submarines can control their depth in this same manner. Applying micro-sized Piezo pumps in a wristband, speech sounds defined by patterns of air poofs in matrix and voice pitch defined by poof frequency, gives an alternative to ear hearing for speech reception. Nano scale application of the nudge concept defines sensor output by contorting Piezos to short out power wires indicating light levels of color sensors in tri-color pixels in video cameras. Reversing the process, the Piezo units in a video display contort when signal charge defines color levels contacting power wires which power the emitters. Display brightness control is independent of this signal definition method. This method uses little power for the amount of work provided.

3 Claims, 18 Drawing Sheets

Figure 8:
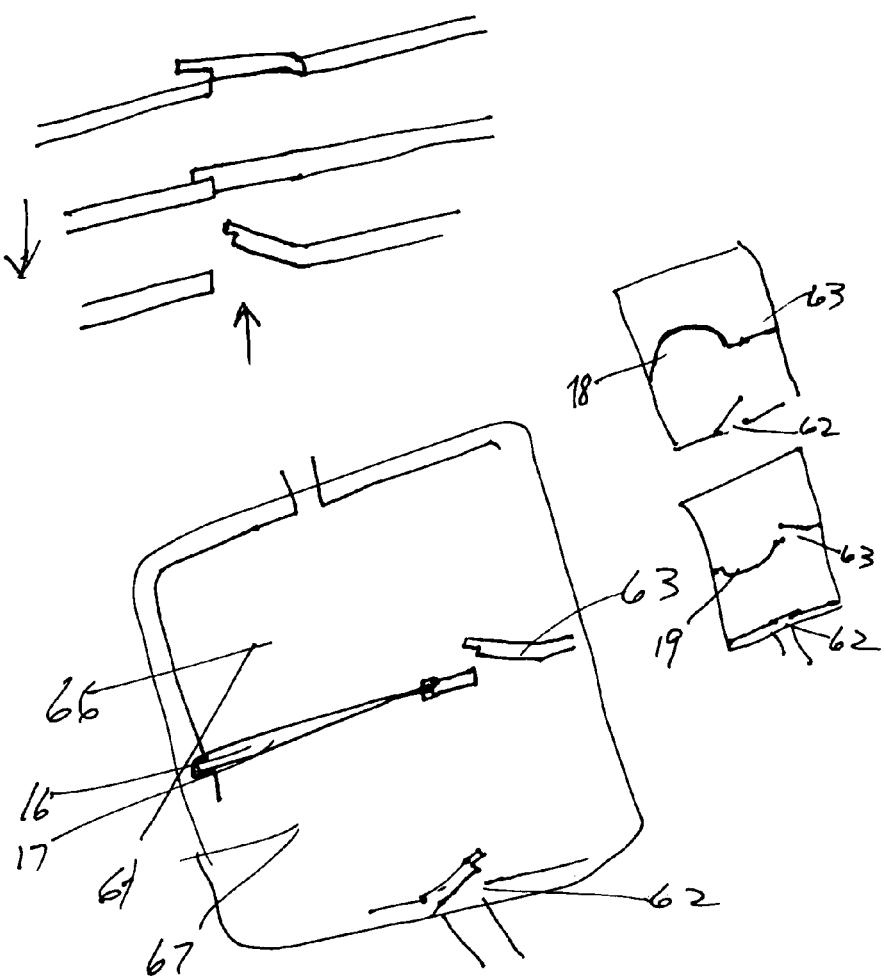

Figure 1
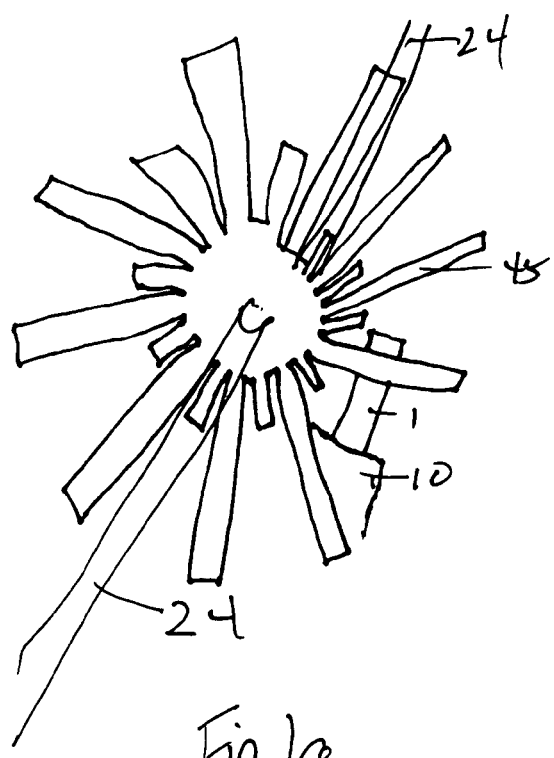
Fig. 1a
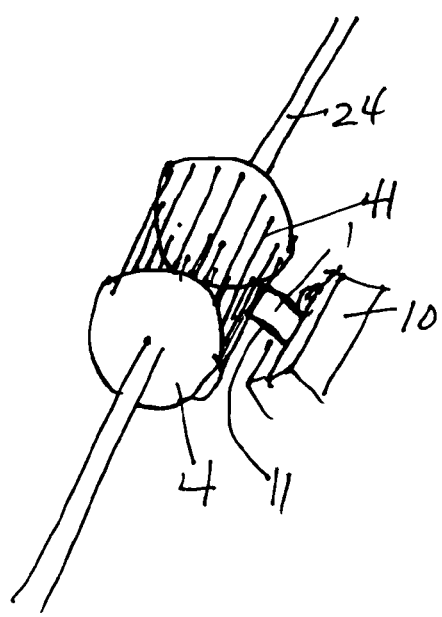
Fig 1b

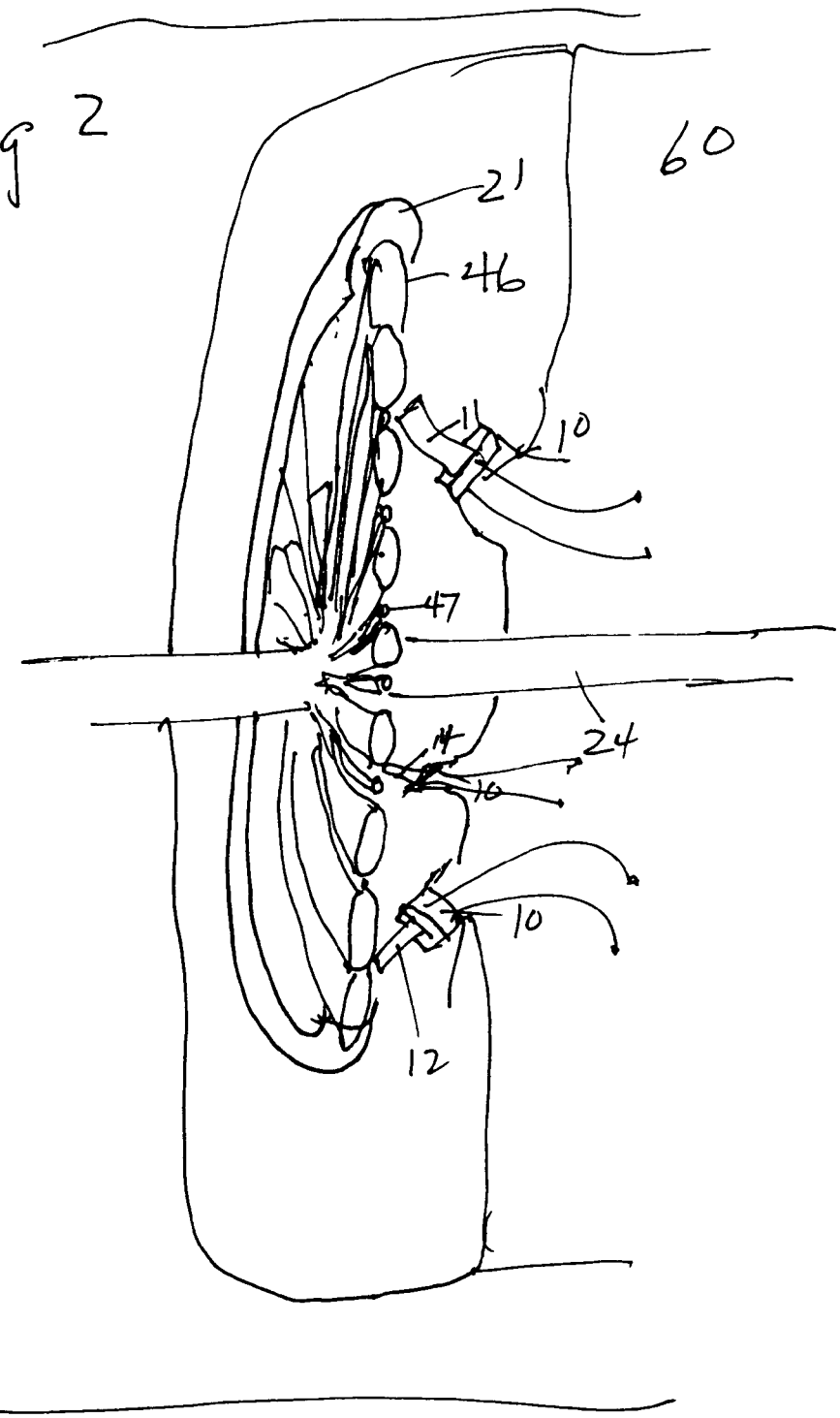

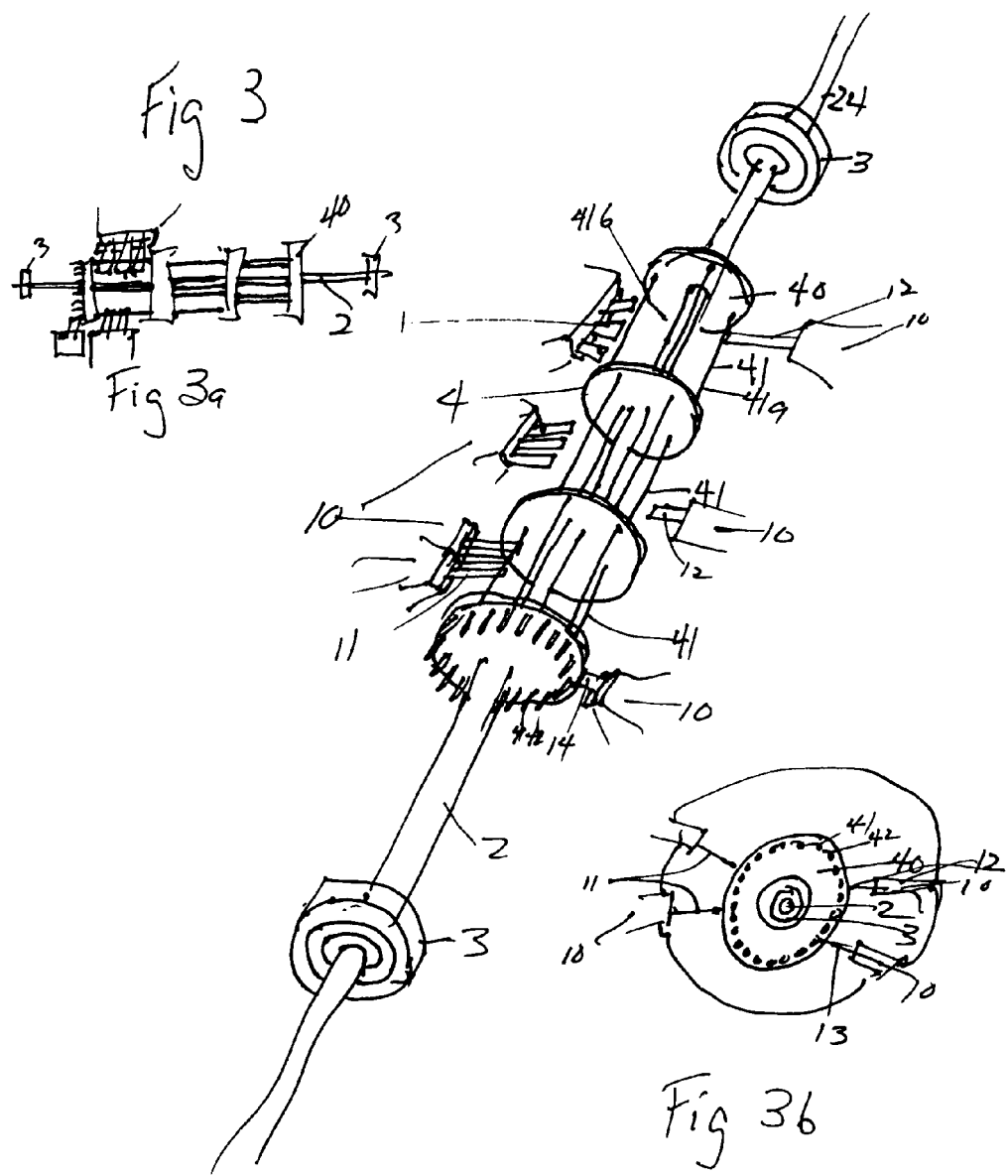

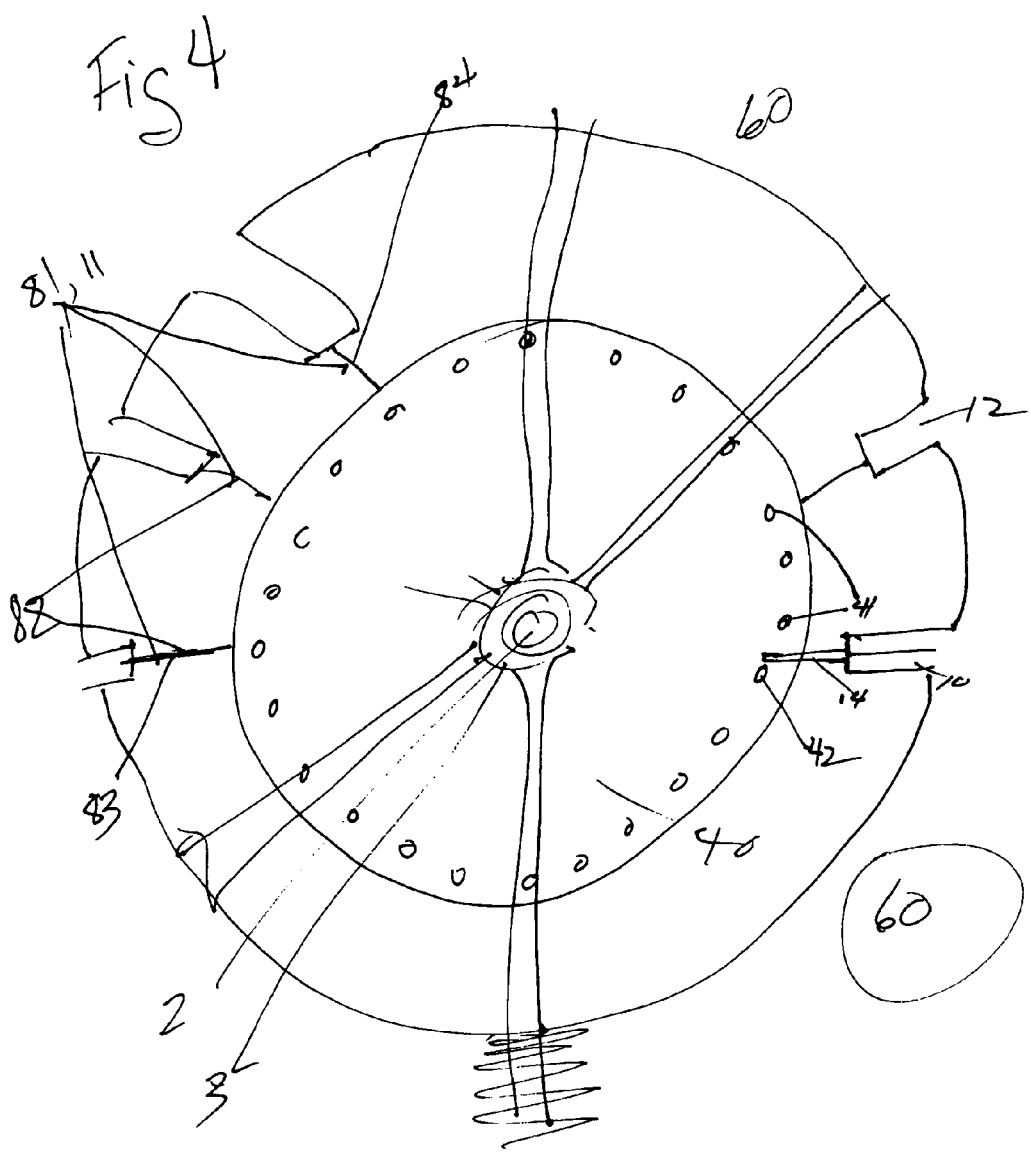

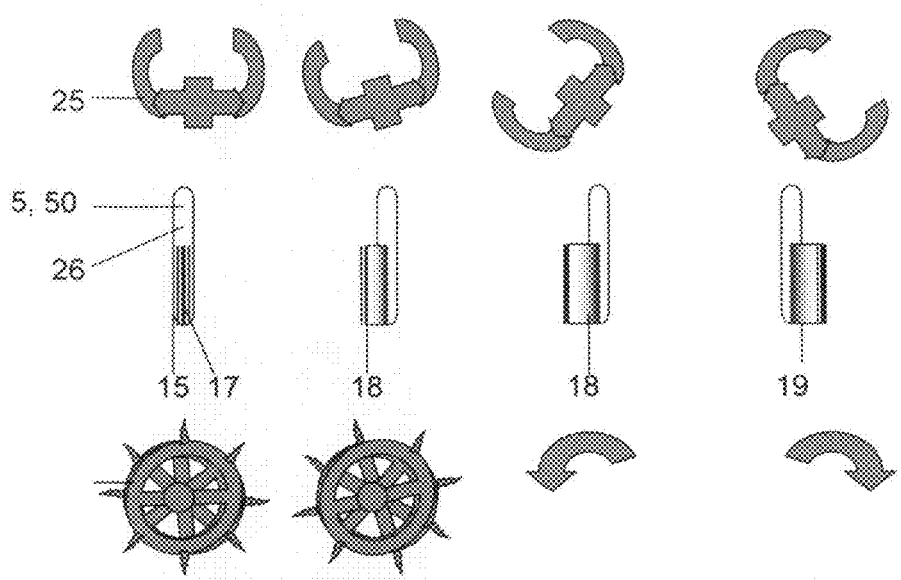
Figure 5
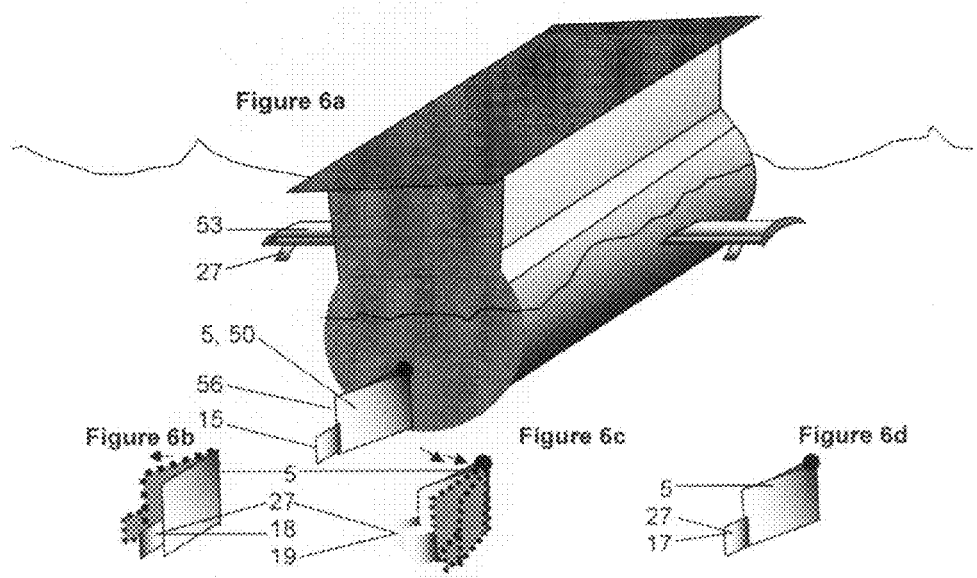
Figure 6
Figure 6a
Figure 6b  Figure 6c  Figure 6d

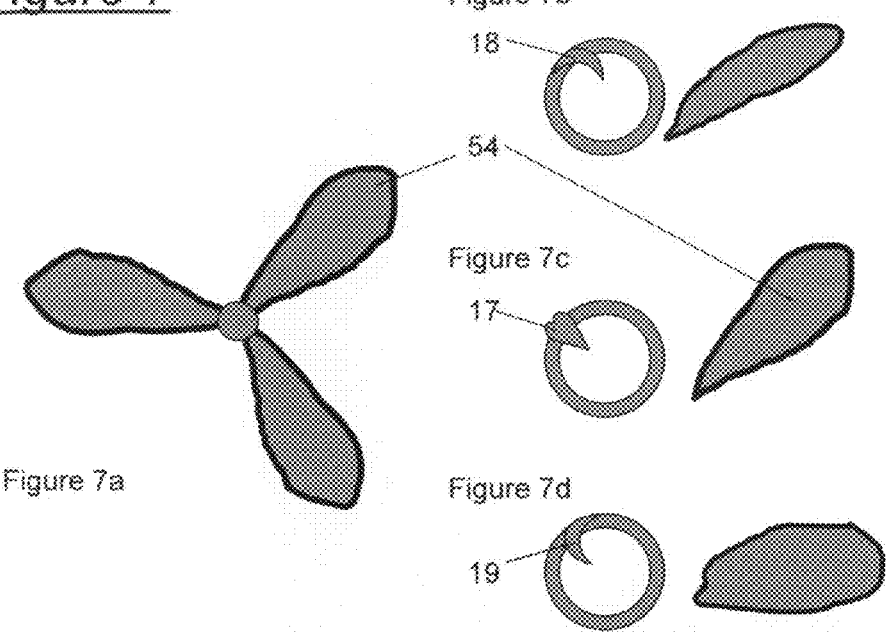
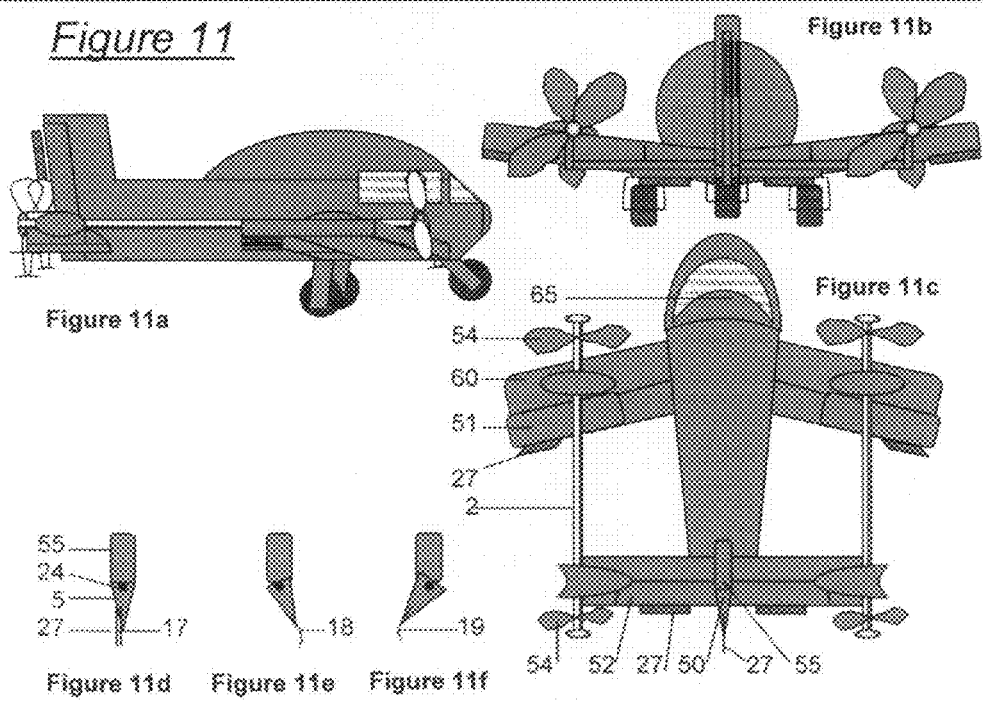

Figure 10
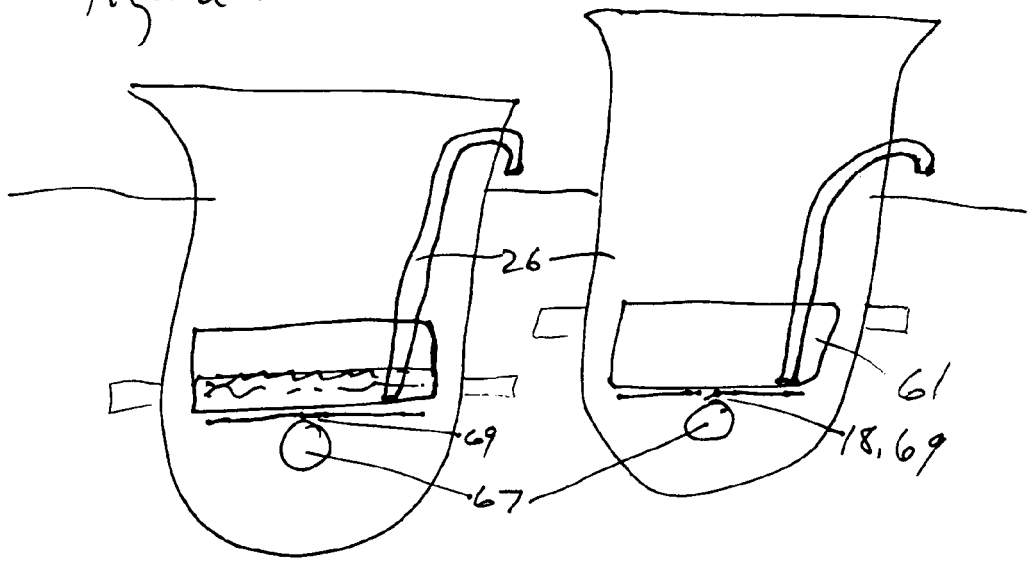
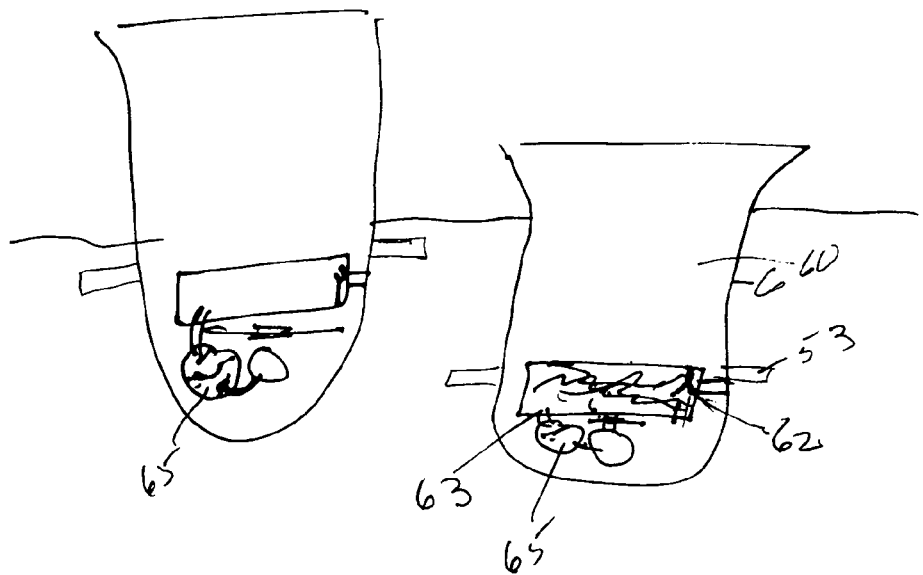

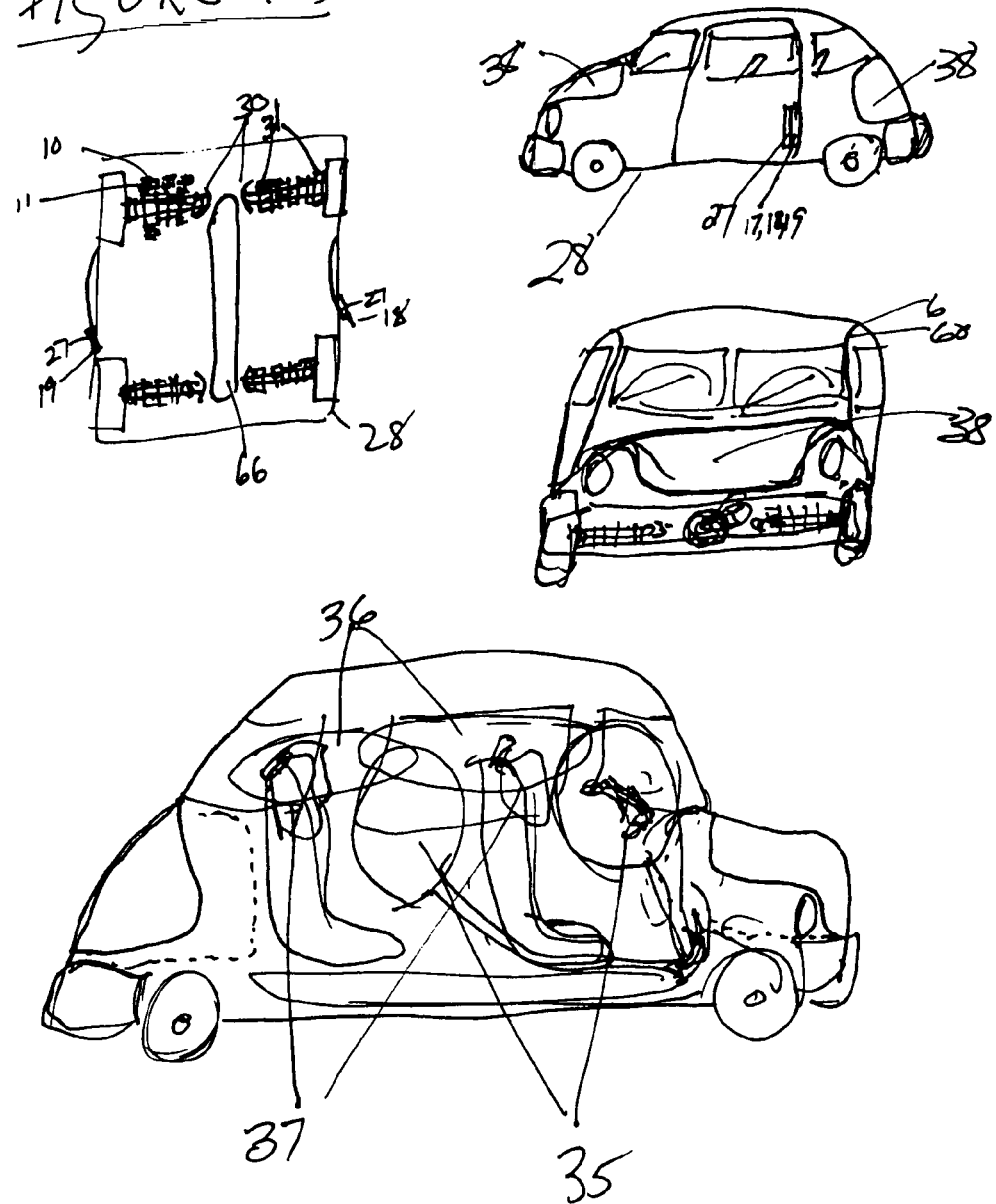

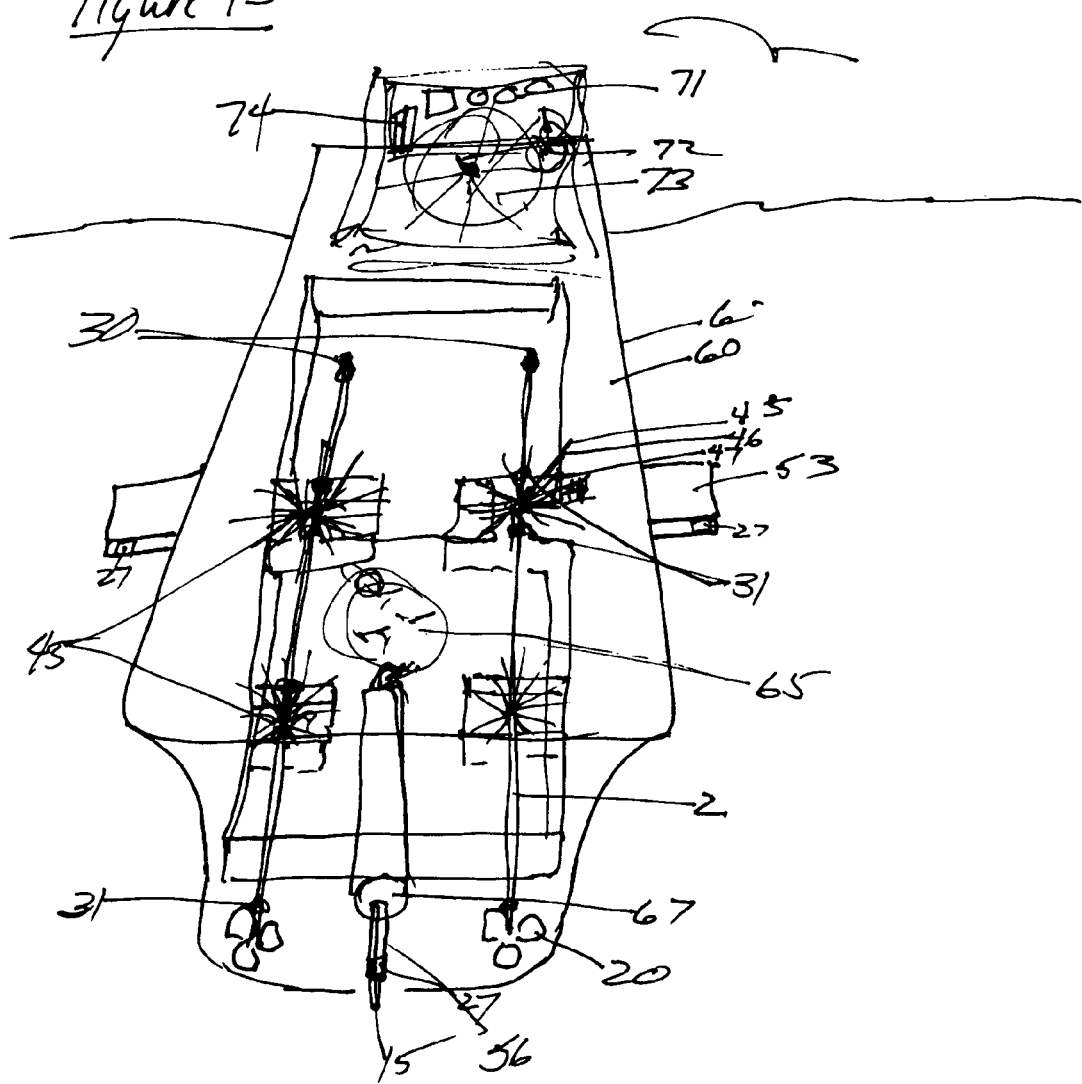

Fig. 14
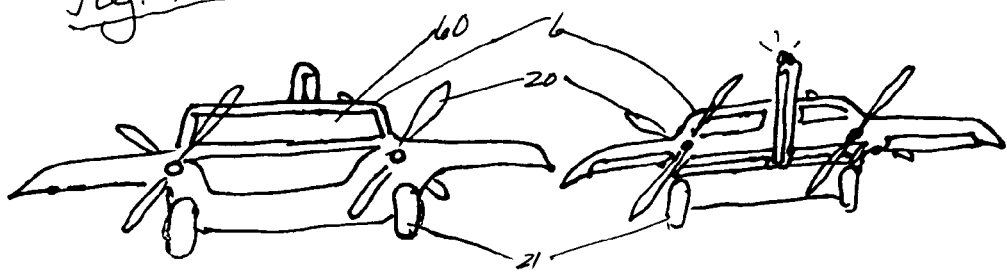
Fig 14a    Fig 14b
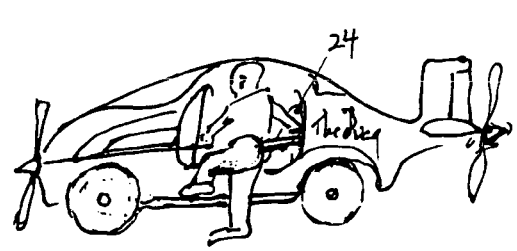   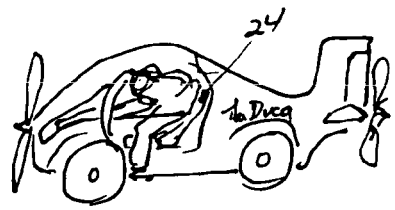
Fig 14c    Fig 14d
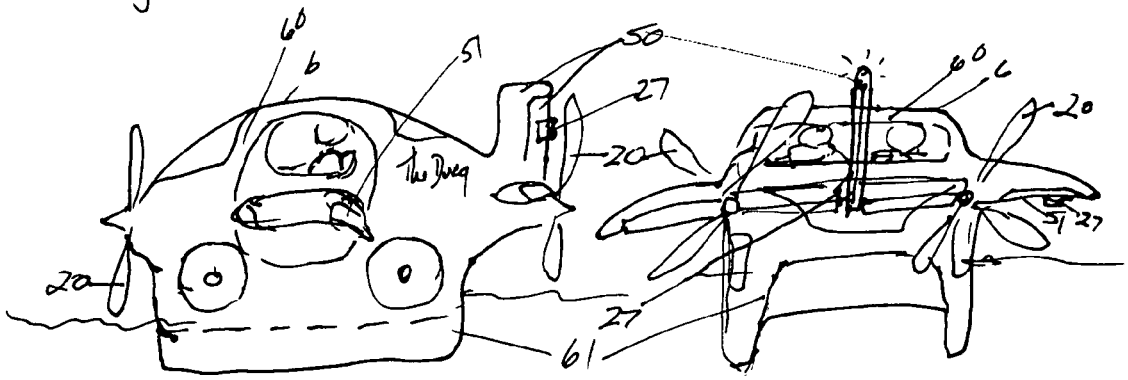
Fig 14e    Fig 14f

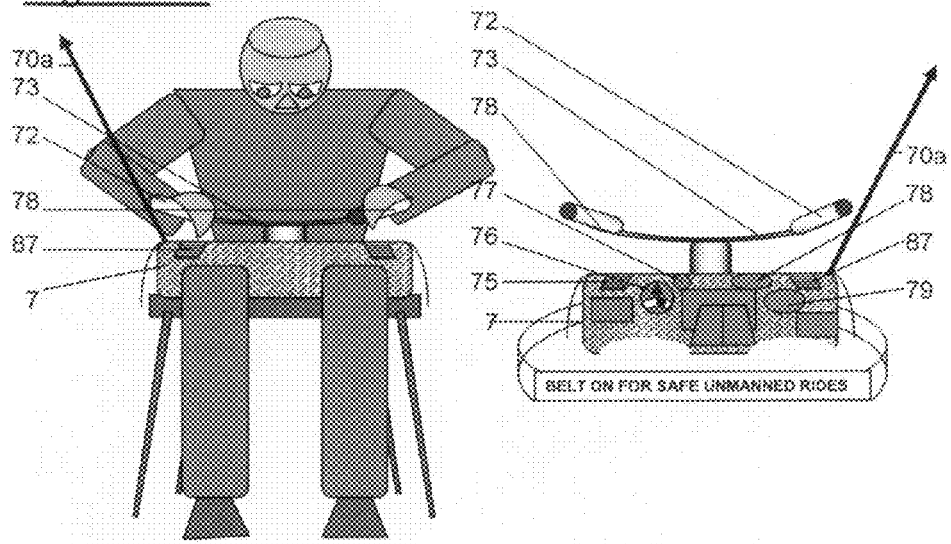
Figure 15
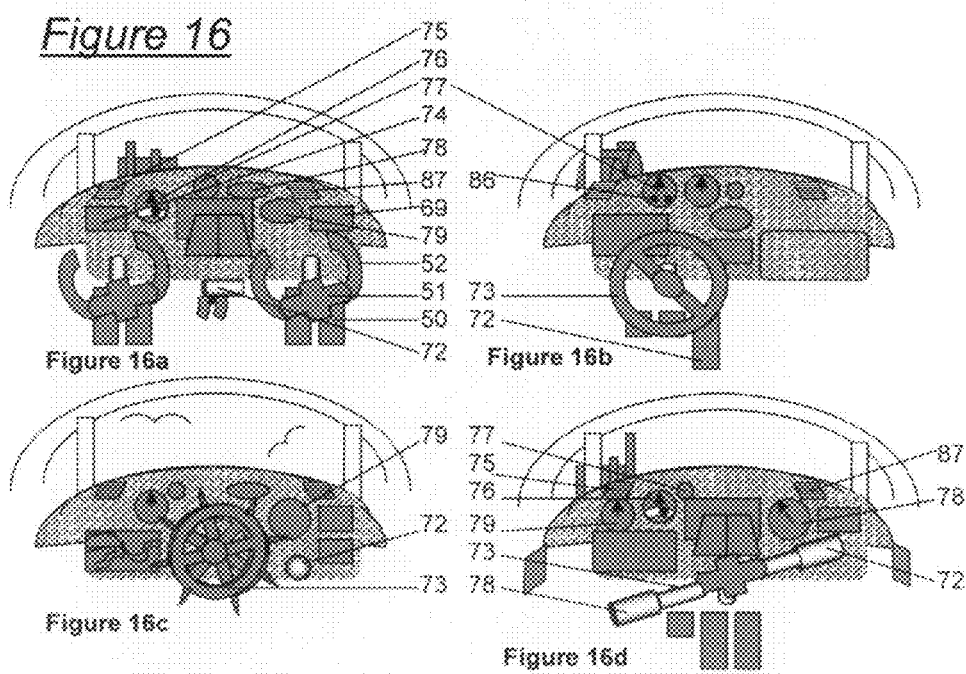
Figure 16
Figure 16a
Figure 16b
Figure 16c
Figure 16d

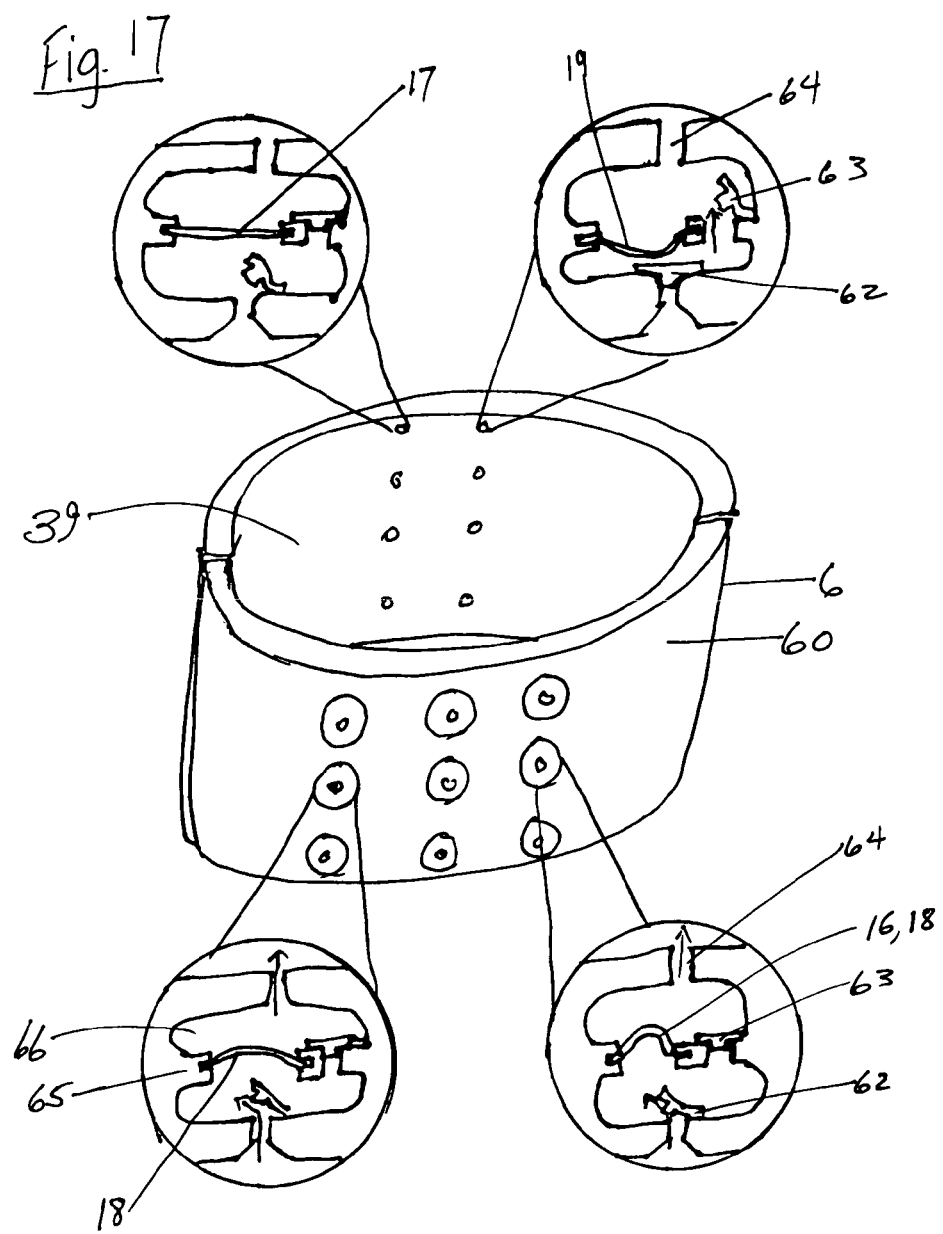

99s for 94

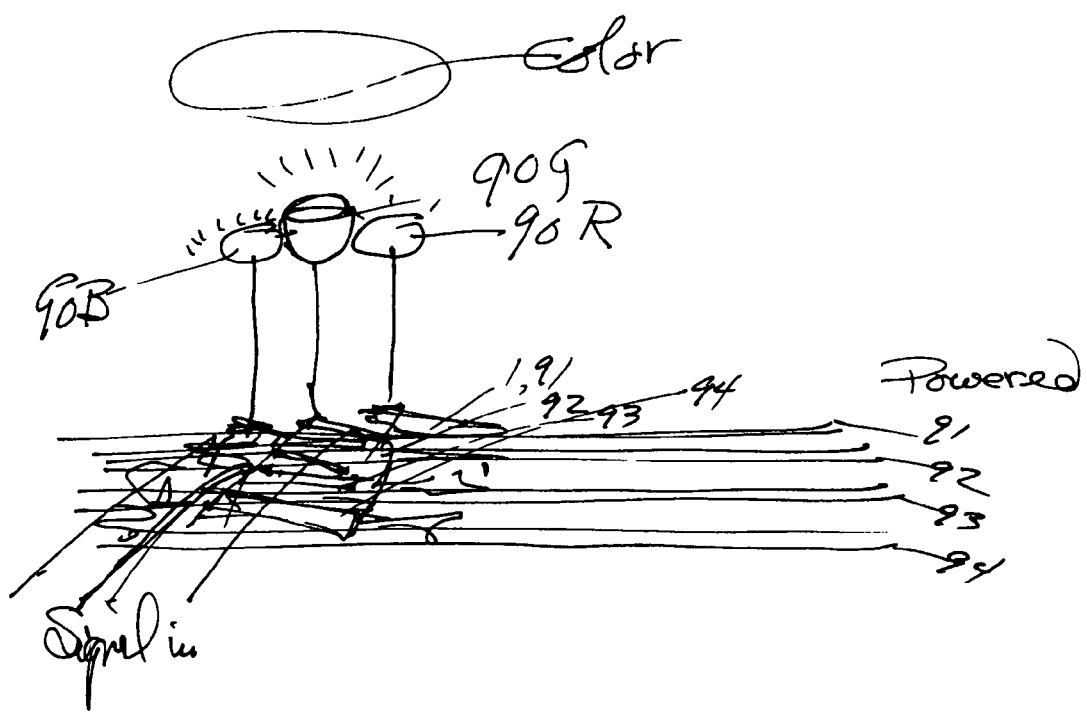

PIEZO ACTION APPLIED

BACKGROUND

Piezo technology has been used extensively in electronics for buzzers, lifter, light reflection deflection. Piezo units are fused, double layered, crystal materials, round or in a strip. When conductive wires are attached one to each layer and power is applied, the Piezo form warps. A planar disc will belly out to a concave lens shape, a rectangular strip will curve into a barrel stay form. When alternating current is applied, warping happens in one direction and then the other. For a round Piezo, it alternates from concave to convex form. A strip will flap, looking at the narrow side with junction of the materials showing, with one end fastened securely, the free end swings left and then right or the reverse if starting on the opposite phase. With direct current persisting, some will contort and recover making a buzz at a frequency dependent on the dimensions of the Piezo unit. In other words, if power is off, it has the planar shape; if on, the warped shape. If left on, it will resonate at its dimensionally determined frequency or holds a warped configuration.

Traditional propulsion in vehicles are engines with cylinders pushing the shaft, often a uniquely shaped crankshaft, having several nudges per rotation, the number depending on the number of cylinders firing. Traditional steering moves wheels or control surfaces changing direction or flight orientation. To center control surfaces easing holding control settings by pilots, mechanical or electrical drives adjust trim tabs that adjust either by physically changing the tab angle rotating electrically or by adjusting tension on guide wires by turning a wheel, which tightens one cable and loosens the other to the tab located on the control surface and adjusting that surface's pitch or position.

Traditional gas transfer is done with a gas or electric motor sucking in air from a large chamber and putting it out into another, using either a piston with a hollow to collect the air in from one compartment and release it in another or a bellows system. Many types of mechanical motion enable pumping.

Piezo electronics involves using a bi-material circle or strip with one material on one side and another on the other. The materials differ in size when electrical charge is applied. This makes the circle go from planar to convex if the power is positive and go from convex to concave if the power oscillates from positive to negative. Similarly, the bi-material strip, planar without charge, curves in one direction perpendicular to the sandwich surface when positive charge is applied and in the other direction with negative charge. This effect is achieved with relatively low power draws. Fixing the position of the circumference of the circle or one end of the strip makes the force useful.

Piezo technology was discovered between 1880-2 by brothers Pierre and Jacques Curie recognizing that paired crystals generated electricity when stressed and by Lippmann who in 1881 deduced mathematically, the opposite, the paired crystals would stress in response to the applied electricity. This invention applies the Lippmann discovery, this second phenomenon, that charge produces stress or dimension change.

The Discovery Application of the Piezo technology to current applications allows Piezo drives to power electric powered vehicles; Piezo trim tabs to adjust vehicle control surface positions and define propeller blade pitch; Piezo air compressor and fluid transfer systems to alter mass and buoyancy and indicate tactile signal of position; and Piezo digitizing quantifying sensor outputs in video cameras and emitter output in displays.

Piezo drives turn the shaft spinning the propeller(s) on air and sea vehicles, both surface and submerged vessels. This same configuration applied to wheel axles turns a wheel in one direction or the other depending on which array of Piezos is activated. For example, if one has dual Piezo drive on a wheel, one drives the wheel forward, the other backward. Applying both the wheel rotation can be stopped. This means, for land electric vehicles, the wheel can drive forward, and depending on the cadence of power, rotate forward at a range of speeds. It can similarly rotate backward at a range of speeds depending on cadence of power applied and number of Piezos. And, it can be stopped.

To enable electric nudging of the shaft, replacing an engine, one applies spokes radiating from the shaft or one or more squirrel cages to the body of the shaft such that a cylinder runs parallel and is centered on the shaft with bars running parallel with the shaft forming the outside of the cylinder. The shaft can be rotated in either direction depending on the choice of the first nudge and continued by timing of continuing nudges. Cruise control can be achieved by having different frequency Piezo units nudging the rotation of the axle. Once speed is achieved, the Piezo with the resonating frequency contacts the spinning cage at the speed desired. Stopping the nudges slows the shaft turning rate. Control slowing or stopping is achieved by powering the resistive intersect Piezo, which impedes passage of the cage bars as the axle turns. A shaft can drive propellers, front and back, for an air vehicle. A shaft can drive left and right wheels or one wheel at a time allowing for rotational steering for a land vehicle. The shaft grounded in a bearing to allow rotation on one end and with the propeller on the other, which drives a sea vehicle. Piezo power drives electric vehicles. The fuel is electrons. Making the body and interior structure of POWER PLASTIC, rechargeable batteries embedded in laminate and molded as needed stores the power, electrons, and are charged from a variety of sources including AC power, solar cells, and wind and tidal generators.

Having independent wheel drive control, the vehicle can be turned by having a slower rotation on the wheels on one side than the other for the four-wheeled vehicles causing turning to the left or the right, respectively. One can turn the vehicle by stopping the wheels on one side while the wheels on the other side rotate making an arc with the long side on the side with rotating wheels and the center of the arc or circle on the side where wheel rotation is stopped. One can also rotate the vehicle by having forward rotation on one side and backward rotation on the other making the vehicle spin in place.

Steering aircraft and boats and ships, one applies Piezo trim tabs to control surfaces where this bi-material strip will arch proportional to power applied. A trim tab is a small segment of the control surface including, but not limited to, rudder, aileron and elevators in an aircraft or the rudder and any fin structure of a ship. Deflection of the trim tab causes the control surface to change angle in response to the extension of the tab. Generally trim tabs are used to center the control surface for light touch steering. Here we activate their role to doing the steering. This method could steer an enroute passenger or freight aircraft remotely preventing hijackers' reaching their planned destinations or to safely land an aircraft aloft when the pilot has a trauma and cannot pilot the aircraft.

Using voltage sensitive Piezo materials as trim tabs, power applied proportional to the deflection of the control surface needed applied to the elevators, rudder and ailerons can steer an airplane. Similarly, this type of Piezo trim tab applied to rudder and gill fins (if desired) can steer and rotate a boat or ship. Combining a large Piezo on the roof of an auto, bus or truck with independent rotation speeds in at least for one pair of wheels, charging the Piezo to bend giving some sail effect in a turn can balance a turn making the passengers and load less reactive to the change in direction of the electric vehicle. These are controlled remotely for unmanned vehicles and from the cockpit, driver's seat and helm of electric vehicles for land, air and sea.

Similarly, propeller pitch control is provided by Piezo movement to adjust the blade angle. Three settings, i.e. degrees of rotation of the blade in the propeller hub, are possible. All blades on the shaft must be controlled to the same degree. Shafts with fore and aft props must have all blades on the shaft at the same pitch. Three levels can be achieved using no power on the Piezo unit for medium pitch used in cruise mode; power applied in one direction provides the low prop pitch for climbing and take-off, and power applied in the other direction, to the other side of the bi-material strip, would cause feathering of the prop used during engine out situations.

Managing altitude and buoyancy of an airplane, boat and ship is achieved by inflating and deflating gas bellows. In aircraft, Helium is the choice gas. Using the Piezo bi-polar motion to fill a chamber and flatten it having one way flow valves directing intake from one chamber and exhaust into another allows the bellows to be filled giving lift to the airplane such that, with sufficiently low mass/volume, it lifts to seek equilibrium with air pressure like a Helium balloon. Takeoff uses fuel at the highest rate of all common flight maneuvers. Balloon style airplane launches save power extending flights by power conservation during take-off and climbs.

This same concept applied on a smaller scale allows Piezo driven sensorial stimulation for matrix pattern presentation, as on the wrist for a Speech Presentation device U.S. Pat. No. 4,520,501, the TactilEar. Here the Piezo pump inhales air or water from the environment through one-way valves and on opposite charge thrusts a stream of air or water through a narrow tube stimulating the skin to indicate a specific matrix position in the signal stream. The Piezo is driven by frequencies proportional to, in this case, voice pitch, allowing identification of a sound by the pattern and voice pitch from frequencies of speech code received by the device. What is nice about using air stream stimulation, and water if swimming, is that the skin will not be calloused from use, as it may were bristles used actually touching of the skin. This device substitutes for and augments ear hearing. Speech is received with tactile input, thus eyes are freed to do seeing tasks.

And, for digitizing sensor electrical output, a series of Piezo units are employed. For binary output, off or on, use a single Piezo unit. To define four levels, off plus three levels of response, have two Piezo units reacting to sensor output. The lowest level elicits a response bending the smaller Piezo. Increased output bends the larger Piezo. If charge is strong enough, both the first and second Piezo bend. Having wiring at the location where the uncharged Piezo unit is not touching, but if charged, it shorts out the wire as it bends and contacts it, the electrical output defines sensor charge levels thus digitizing the signal even with sensors and Piezo units in nano-scale configurations. If application demands eight levels of output, a third Piezo, double capacity of the second Piezo, is included in series. Were the power output from the sensor, say, for example, molecules of Chlorophyll, excited by light in the red spectral area, at low levels, off through three levels of output, output is as just described. Higher output activates the third Piezo only, then increasing as the first and third units respond, the second and third, and, for the maximum output, all three defining a total of eight output levels. Adding a fourth Piezo enables sixteen levels of output. If the Piezo output digitizers are used with each of three sensors for, say, a tricolor video camera pixel, the resulting chromatic differentiation in color would be 512 colors. Using a fourth Piezo, again double the third, each sensor has sixteen scale units, zero through fifteen, and the color spectrum possible for the camera totals 4,096 colors. This would produce a quality video or television image working in both micro and nano scale sensor circuitry.

Applying the Piezo units to drive the power levels of each chromatic unit in the pixels, voltage applied in the instant a specific pixel is being defined would emit the brightness of color dependent on charge available to excite the molecule. The circuit powered the Piezo units, similar to the camera, provides available charge on the wires. As the Piezo is charged, contacting the power wires, the emitter is charged according to the charge level transmitted to it. With no power, that color emitter is black. With one unit, the smallest with a trickle of power, it would glow a bit. With two a bit brighter on through all Piezos shorting out the power wires making the emitter scream the color it emits. Were it the blue emitter, the color would emit strong blue light. If the other two emitters were also fully charged, for red and for green, the resulting color would be bright white. Again, all off, the pixel would be black, and for all other levels, mixing the three colors, a full spectrum of colors are on the menu.

The Piezo technology described here takes advantage of the bi-material unit's responding to a charge source to create a change in entropy, in direction, in pressure, in charge level recorded and in brightness emitted. This small component implements major change enabling power-efficient electric vehicles and electronic equipment.

DESCRIPTIONS OF FIGURES

FIG. 1—Propeller drives, both spoke and cage, with a single Piezo unit.

FIG. 2—Wheel drives, dual Piezo units, for forward, reverse and braking.

FIG. 3—A multi-Piezo shaft drive with driver, starter, and braking Piezos.

FIG. 4—Piezo nudge timing intervals for shaft rotation control.

FIG. 5—Piezo trim tab on control surfaces.

FIG. 6—Piezo trim tab control for airplane controls and vessel rudders.

FIG. 7—Piezo prop pitch adjustments.

FIG. 8—Piezo air compressors for adjusting release and compression of gases.

Figure 9:
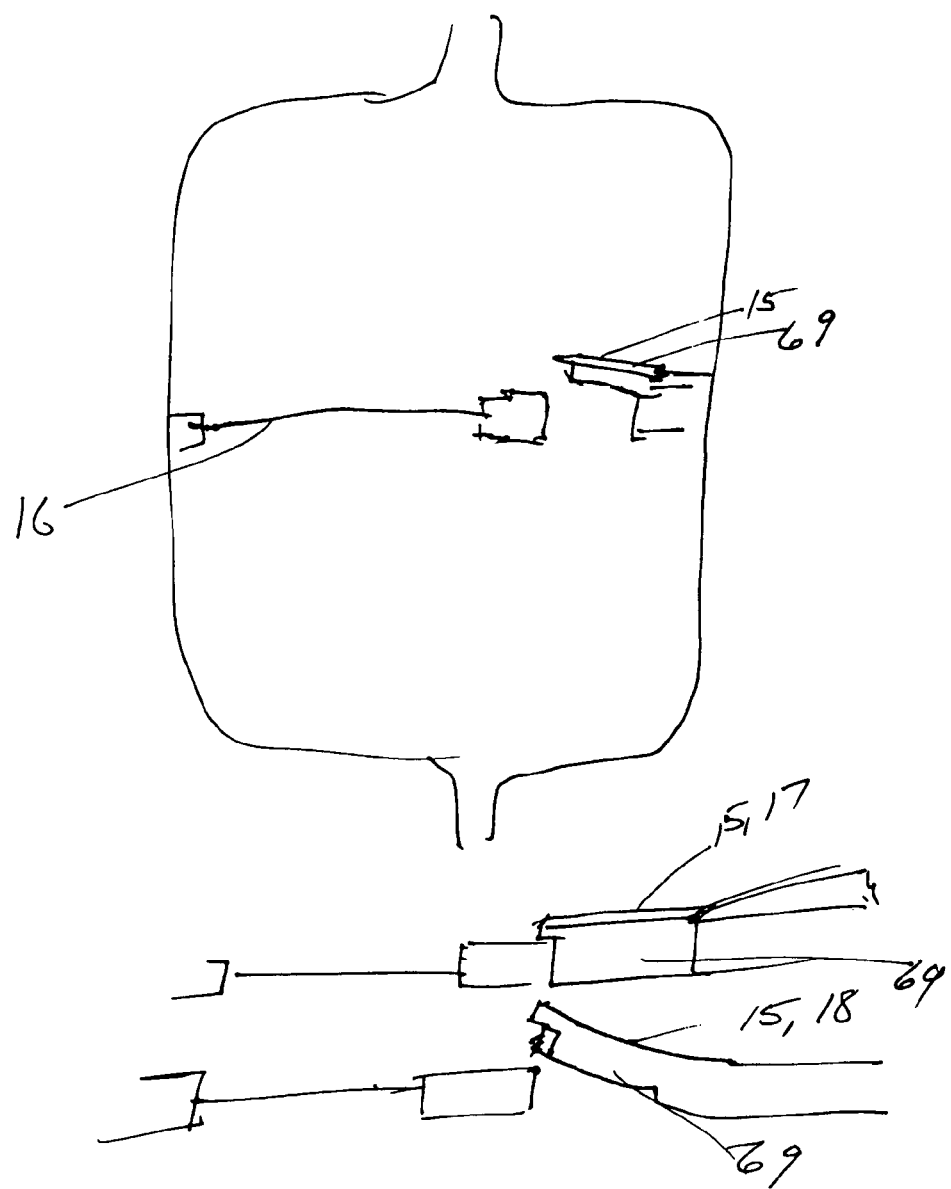

FIG. 9—Piezo pump with flow activated valves, with Piezo controlled valves.

FIG. 10—Ship mass control for surface to subsurface transitions.

FIG. 11—One design showing Piezo placement in electric air vehicles.

FIG. 12—One design showing Piezo placement in electric land vehicles.

FIG. 13—One design showing Piezo placement in electric sea vehicles.

FIG. 14—One design showing Piezo placement in electronic duck, capable of flying, floating under power, and operating on land.

FIG. 15—Remote control panel or box.

FIG. 16—Instrument panel, dashboard, helm designs.

FIG. 17—Piezo pump used for tactile stimulation for matrix position.

Figure 18:
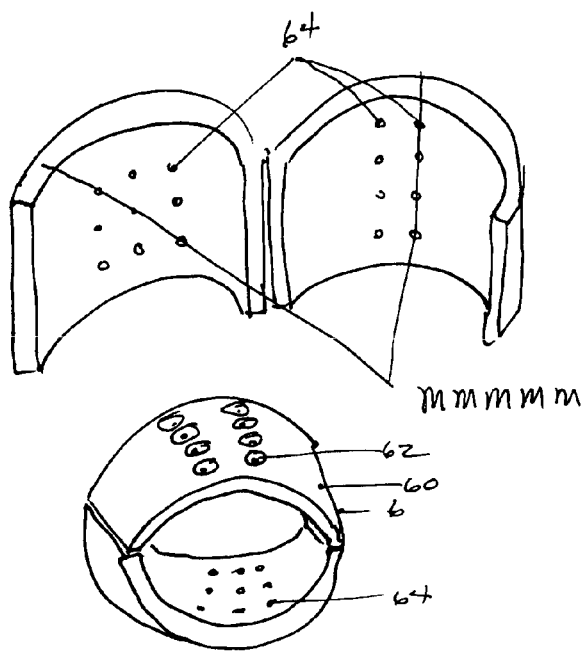

FIG. 18—Piezos in tactile wristband enabling tactile indication of sound, by positions; voice pitch, by frequency.

Figure 19:
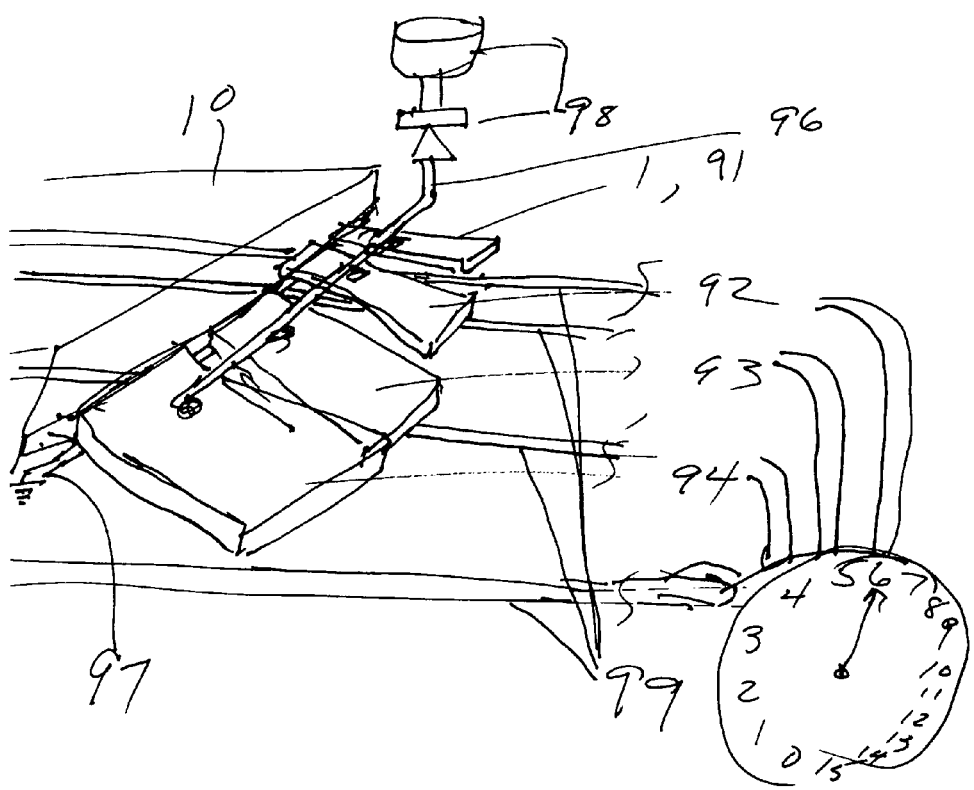

FIG. 19—Piezo digitizer of sensor output for single sensor.

Figure 20:
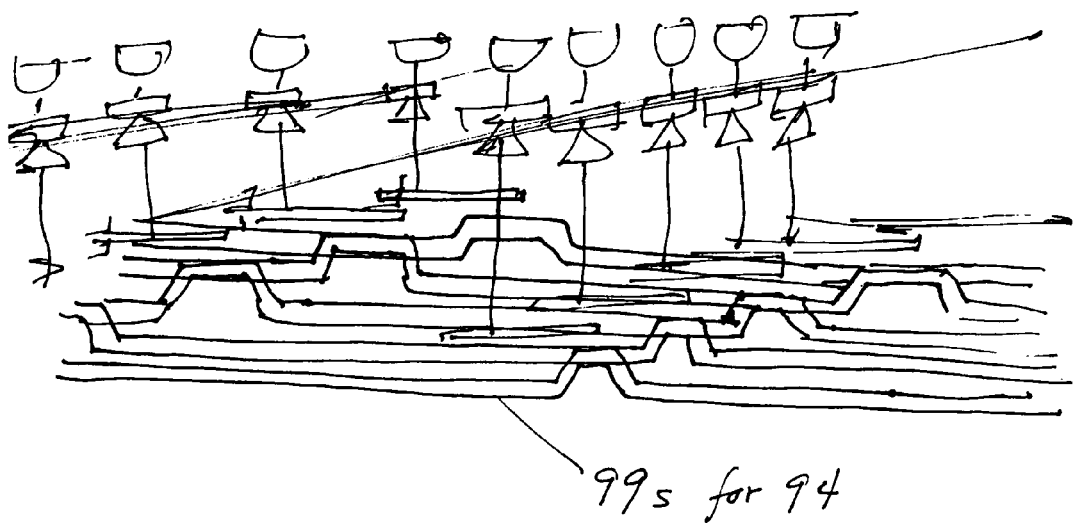

FIG. 20—Piezo digitizers on multiple sensor arrays for a tri-color pixel.

FIG. 21—Piezo charge regulation for digital television displays

THE METHOD

Application of the Piezo technology to requirements of current applications allows Piezo drives for electric powered vehicles; Piezo adjustment of trim tab configuration for steering and adjustment of propeller blade pitch; Piezo air compressor or fluid transfer systems and tactile stimulation for code reception; and Piezo digitizing nano-sensor output and enabling digitized output adjusting charge to emitters useful in electronics as digital video cameras and displays.

Children on a playground with a manual merry-go-round start the rotation of the apparatus by pushing with their feet against the ground and can maintain and increase its speed of rotation by continued kicking the ground deflecting it in the direction of rotation. Similar operation is provided by one standing aside of the merry-go-round by the constant nudging of vertical piping near the perimeter. The rider's foot and the outsider's nudge is replaced in Piezo electric vehicles by Piezo nudging. Also, Piezo components have differing resonant frequencies depending on their dimension and composition. Using a variety of Piezo units, appropriate resonant units can be used for maintaining specific, commonly driven speeds based on these "nudge-rates."

Configuration options for Piezo drives on a propeller shaft can power an air or sea vehicle, for sea, both surface and submerged. The shaft attachments can be in spoke configuration or a cage configuration held fast to the drive shaft with spokes for both rings holding the rungs, which the Piezo units push when excited. This same configuration applied to a wheel axle will drive a wheel in one direction. Using a dual Piezo drive on a wheel, the direction of the turning of the wheel can be reversed, and the wheel rotation can be stopped. This means, for land electric vehicles, the wheel can drive forward, and, depending on the cadence of power, rotate forward at a range of speeds. It can similarly rotate backward at a range of speeds. And, it can be stopped.

FIG. 1 shows two methods of applying the nudging forward to turn a propeller on a shaft. The first, FIG. 1a, shows the radial spoke array 45 serving as the nudge object to spin the shaft or axle. Piezo strips 1 are mounted 10 such that the charged configuration bends the strip ends to contact and advance the spoke 45, thus turning the shaft 24 and, in effect, the propeller 20. In like effect, FIG. 1b shows a squirrel cage 4 mounted on a shaft or axle 24 with bars 41 parallel to the shaft with Piezo strips 1 mounted 10 in such manner that when charged, their curvature contacts a bar, nudging it forward 11 encircling the shaft. Multiple Piezo units for forward motion 11 can be mounted in both configurations.

FIG. 2 shows a more sophisticated Piezo drive 1 with the spoke configuration 45 bars to move the shaft 24. Here several forward nudging Piezos 11 are mounted 10 contacting several of the spokes 46, a Piezo is also mounted to serve as a means to reverse 12 the shaft direction. This would apply to land vehicle drives where reversing the wheel direction for wheels on one side of the vehicle from that on the other would spin the vehicle in place and for braking, slowing the shaft rotation rate by counter nudges to forward motion. To prevent a 'null' situation where no Piezo, forward or reverse, can touch a spoke 46, thus having vehicle motion stalled, starter spokes 47 mounted between regular extended spokes 46. Spokes 46 can have a tire 21 connected to their ends giving more weight toward the outside of the circle for flywheel advantage. Starter Piezos 14 nudge any spoke 46 or 47 moving the shaft so it is in position for either the forward or reverse Piezos, 11 or 12, can then nudge spokes 46 and effect shaft 24 rotation. The shaft with spokes must be balanced for smooth Piezo drive operation.

FIG. 3 shows one design of the Piezo drive configuration on a propeller shaft or wheel axle. The shaft or axle (2) is mounted on bearings (3) enabling free wheeling, reducing rotation resistance. The squirrel cage (4) mounted on the shaft between the bearings has shaft-centered circular plates (40) fixed mounted to the shaft with holes to hold the cage bars (41) fixed securely to the plates, equally positioned from the circumference and spaced equal distance apart. This configuration has three sets of bars with four bars in each space running parallel with one another. Here are twelve bar positions so the first set has the 12, 3, 6, and 9 o'clock positions; the second, the 1, 4, 7, and 10 o'clock positions and the third, the 2, 5, 8, and 11 o'clock positions. Rectangular driving Piezos (1) are held securely across the Piezo mount (10). Groups of three Piezos, one or more for forward nudging, one for reverse nudging, and one to stop the shaft rotation, are mounted so one or more groups nudge each segment of the squirrel cage. If more than one group nudges a single segment, they can be mounted on opposite sides of the segment such that the forward Piezo (11) on the first side contacts the 3 o'clock bar (41a) and the other side contacts the 9 o'clock bar (41b). On one end of the squirrel cage starter bars extend for each hour hand's half hour position (42). For cruise control the sets of driver piezos differing in size one with another allow choice of Piezos to select nudge frequency. One additional driver Piezo is mounted here to serve as the Starter Piezo (14). This will nudge the shaft rotation forward in case when the cage bars (41) are aligned so none of the driver piezos (11) affect the rotation.

FIG. 3a shows the view parallel with the shaft (2).

FIG. 3b shows the end view of the shaft. It also shows three piezo contact designs for forward (11), reverse (12) and stopping (13) the shaft rotation. Having separate Piezo drives for each function improves the clarity of the controls. Yes, changing the timing of the nudge during slow speeds might change the propeller direction. The person setting the controls would have great difficulty in making these distinctions. Thus the choice here of which drive option results in using the appropriate Piezo unit in the set of three for each group.

FIG. 4 shows the Piezo nudge timing intervals for shaft rotation control. Repeating the FIG. 3b view (8), Starter configuration (80) when none of the driver piezos (1) can contact the cage bars (41), the starter Piezo (14) will nudge a starter bar (42) positioning the cage bars so the driver Piezos can nudge the cage bars. The starter is controlled by a panic button and is only used during null performance of the driver Piezos. Power start or first gear, slow rotation configuration (81) shows all forward nudge contact Piezos (11) nudging the appropriate cage bars (41). Second gear, medium speed rotation (82) uses fewer contacts with the cage bars by stopping some of the Piezos from functioning. Third gear, fast (83), is achieved by further reducing the number of functioning Piezos. Cruise mode for retaining a constant speed (84) is achieved by using one Piezo every few rotations, adjusting the rotation number to maintain a given rotation rate. With each Piezo set having a different resonance frequency, the nudge rate or speed to maintain can be determined by selecting which Piezo is active. It is the equivalent of the transmission function replacing the gearshift and in airplanes, the throttle control.

Having independent wheel drive control, the vehicle can be turned by having a slower rotation on the wheels on either the left or the right side of the four-wheeled vehicles causing turning to the left or the right, respectively. One can turn the vehicle by stopping the wheels on one side while the wheels on the other side rotate making an arc with the long side on the side with rotating wheels and the center of the arc or circle on the side where wheel rotation is stopped. One can also rotate the vehicle by having forward rotation on one side and reverse rotation on the other making the vehicle spin in place.

FIG. 5 illustrates steering aircraft 25 and boats and ships 26 applying Piezo 1 controlled trim tabs 27 where this bi-material strip 15 will arch proportional to power applied. A trim tab 27 is a small segment of the control surface 5, be it rudder 50, aileron 51 and elevators 52 in an aircraft 25 or the rudder 50 and any fin structure 53 of a ship 26.

The manual trim and the electric trim tab adjustment on air and sea vehicle control surfaces 5 can be replaced by Piezo tabs 15 which lay planar to the trailing edge of the control surface and when reconfigured by positive or negative voltage applied, deflect the control surface. This provides steerage for unmanned vehicles by controlling the rheostat settings remotely. It also can apply to aircraft as airliners allowing remote steerage in emergencies as when the pilot is incapacitated or hostages have gained control of an airliner in flight. Security to prevent remote pirating of these aircraft must be in place for safe use of this technology to handle crises.

FIG. 6 shows trim on control surface (5) for air and sea vehicles. The trim tab Piezo (15) has variable bending depending on voltage level and direction based on charge, positive or negative. It is best located on the trailing edge (56) of the control surface. Bending the Piezo causes it to catch the airflow or water current leaving the control surface and deflects the whole control surface initiating direction change. Once the turn is complete, the Piezo voltage is stopped and the plane or boat retains its new direction, orientation or roll status.

FIG. 6a shows trim tab 27 deflection with positive voltage 18 and FIG. 6b shows it with negative voltage 19. FIG. 6c shows no charge position 17 of the trim tab. The respective deflections of the control surfaces 5 are also shown.

FIG. 7 shows Piezo in the prop hub, one for each blade, causing the blade to twist adjusting prop pitch providing another way of controlling airspeed and maximizing performance in cruise mode. For light, unmanned aircraft, the prop blade 54 control can be a three-setting control with Piezo charged positive reduces pitch, air cut, 18; cruise 17 has steeper pitched blade; and charged negative 19 turns the blade cross-section parallel to the direction of flight to cut the air not turning during forward motion, i.e. feathered.

A Piezo pump has a major Piezo strip or disk inflating a bellow unit with one-way valves fed inward from the containment being pumped out and feeding outward to the repository tank for the gas or liquid. One can use passive valves like in the heart, or active valves, which can be Piezo units with valve closed with power off or on, and open with power reversed opening and shutting the flow control. Piezo opening valves and sealing them shut and another expanding and deflating the bellows provides a double Piezo pump. Using a Piezo gate or valve to release the gas or water from the bellows to the containment vessel provides a triple Piezo pump.

FIG. 8 shows the Piezo pump 65 with one-way valves, like the heart, with intake valves 62 and exit valves 63, allows liquid or gas transfer from one chamber to another 61, even building up pressure in the receiving container 66 while simultaneously reducing the volume or air pressure of the other container 67, powered by the Piezo 16.

A Piezo pump has a major Piezo strip 15 or disk 16 inflating a bellow unit 68 with one-way valves 62 fed into from the containment being pumped out and 63 feeding out to the repository for the gas or liquid.

FIG. 9 illustrates the Piezo pump 65 if active valves 69 are preferred to flow control opening and shutting, Piezo 15 can be activating and sealing shut the valves as required. A Piezo gate or valve 69 can also release the gas or water from the repository vessel to the containment area being closed, for example, with no power and opened with charge applied.

FIG. 10 illustrates use of gas sack expansion 61 to increase buoyancy in a ship. The gas sack is horizontally positioned centered fore to aft, port to starboard in the ship or boat 26 so inflation does not "rock the boat." Increasing the buoyancy, filling the sack 61 from a tank of compressed air 67 can be done using only one Piezo controlled valve 69 keeping it open by applying charge 18 until sufficient air has passed giving the ship proper buoyancy to float further out of the water, increasing its portion above the water surface, and then stopping the charge 17 so the valve returns to the closed position. Note that this valve rests in the closed position and opens into the air source by powering the Piezo. When wanting to lower the ship in the water, reduce buoyancy, this valve 69 will remain shut while the Piezo pump 65 intakes air through valves 62 from the gas sack 61 and pumps it through exit valves 63 into the compressed air tank 67, pumping against the pressure gradient. Aircraft can handle the Helium similarly, but leakage is greater.

FIG. 11 shows an electric aircraft with Piezo powered propellers, control surfaces 5 with Piezo trim tabs 27 on rudder 50, ailerons 51, and elevators 52, propeller blade 54 control and Piezo valve 69 releasing compressed Helium into the air sack 61 for lift off and in flight climbs and Piezo pump 65 to return Helium to the compressed air tank 66 to lower flight altitude and to allow better aerodynamics for active flight, as were it doing flight maneuvers or engaged in a dogfight with another aircraft, not just holding surveillance positions in the prevailing wind. Where is the power source in the aircraft? In the body 6 and interior of the aircraft which is constructed of Power Plastic 60, laminates of rechargeable batteries in circuitry. The fuel is electrons leaving the protons of Hydrogen behind as well as the dangers of it and gasoline or oil fuels. FIG. 11a shows the cross section of a control surface with the leading edge 55 having the axle, which is held fast on both ends of the control, and the trailing edge 56 where the trim tab 27 is in the "no-charge" position 17. FIG. 11b shows the control surface 5 with the trim tab 27 having the Piezo unit positively charged 18. Note here how the control surface angle changes with the trailing edge 56 below the leading edge 55 of the control surface. FIG. 11c shows the effect of putting negative charge on the Piezo 19 in the trim tab 27 on the control surface 5.

Were these Piezo trim tab units 27 with remote control, made of Power Plastic 60 and kept charged, placed on the control surfaces 5 of aircraft, the aircraft could be externally controlled during a crisis. For example, if the pilot became incapacitated in flight or a hijacking happened, the aircraft could be flown externally, steering it to land at the nearest airfield or steering it away from any structure the aircraft is aligned to crash into. This system for electric aircraft can include power drive controls as well, both for on and off with braking, and even with level of power, i.e. air speed control.

FIG. 12 shows electric land vehicles 28 with a chassis, which could carry an auto, a bus or a truck structure. This is a four-wheel drive vehicle having independent squirrel cage drives 4 on each of the four wheel shafts 24. During normal driving, the back two wheels, or the front two wheels can be locked in synchronous rotation and the other two wheels independently controlled to provide steerage by changing the rotation speed one to another to turn the vehicle—slow on left, faster on right wheel will negotiate a left turn, for example. Some Piezo inserts 27 in the body of the vehicle serving like trim tabs can configure the outer skin to accommodate a turn keeping better road contact and giving passengers a balanced ride. With compressed air 23 available, air bags 34 can be inflated with Piezo valves 69 triggered by airbag release circuits filling forward 35, side panel 36 and even headrest airbags 37 to protect driver and passengers. A Piezo in the seat cushion can indicate if a person or object is there and the airbag release system can be limited to serving those seats with weight on them. After the event, the Piezo pump system 65 can draw the bags back into place to be used again. Some attention to repacking these bags is needed.

FIG. 13 shows one design for an electric sea vehicle 26, i.e. boat or ship. Though a catamaran many have two or three drive axles and propellers, this design has one with the radial spoke 45 design. For power to cut through the water, three sets of nudge units 4 are applied to the single propeller shaft 24. The radial units 4 have the driver spokes 46 and the smaller, interspersed starter spokes 47 with Piezo units 1 on each. One or two on the starter spokes since they just nudge the shaft to rotate allowing the driver spoke 46 Piezos, forward 11 or reverse 12, to begin contacting the driver spokes 46 so the shaft 24 turns. This, in turn, turns the propeller 20, which propels the ship. One could include variable propeller blade capability, but this would only be important for multiple propeller craft when an engine is out of if used in steerage.

A rudder 50 trim tab 27 allows electrical steering. It is placed on the trailing edge 56 of the rudder unit running vertically in the water. With no power applied to the trim tab Piezo 17, it extends straight back from the rudder, which stays centered. Putting positive power on the Piezo, the trim tab Piezo 18 curves to the port side forcing the rudder to move starboard and the ship 26 to turn into the starboard direction, having the compass direction go to lower numbers of degrees for the heading of the ship. Applying negative power to the trim tab Piezo 19, the Piezo curves starboard, moving the control surface port and the ship turns in the port direction until the power is released. Then the ship sails on the new course, having in this instance, a higher degree number for the ship's heading. To soften the turn and keep better balance for passengers, gill fin 53 trim tabs 27 can be employed to right the ship during a turn or otherwise configure it for the sea conditions encountered to right the ship and to hold the heading.

Buoyancy control, determining how high above the water surface the ship rides, or how deep in the water it submerges, either air from a compressed air tank or water from the sea can be pumped into a sac 61 that expands the height of the ship and chances its mass ratio with the water at the depth encountered. The surface exposure is controlled by pumping air in and out of the air pack for surface sea vessels.

A submarine carries ballast that weighs down the vessel so it will sink. Controlling its water to ballast ratio defines the depth level of this vessel. Using air, if the depth is sufficient, will only transfer compressed air from the container to the air pack making no change in air compression or buoyancy. This system is illustrated in FIG. 10.

FIG. 14 shows an electric duck that operates in the water, in the air and on land. It is shown in six renderings, FIGS. 14a and 14b show the duck front view and back. The body 6 is Power Plastic 60 storing electricity. It has four propellers 20, two on each shaft, side right and left clearing ground, tires 21, and wing tips are door panel mounted. The rudder 50 required for flight has the trim tab control 27 and a tip light with backup turning and brake lights. Front view shows headlights with turn signals, windshield wipers, wingtip lights. Passenger seats are two by two front and back with storage in the broad nose between the propellers and entering from the side doors, flipping forward the back seats, one can access a luggage area. FIGS. 14c and 14d show passenger entering and exiting the vehicle. Shafts 24 for the propellers cross the door openings, which one climbs over to enter the fuselage. The Piezo driven tire axles propel the vehicle on land.

FIGS. 14e and 14f give side and rear views of the sea accommodation with inflated side panels 61 stored under the door opening, front to back making a catamaran, double extension down into the water well below the tires. Also, an airbag 61 stored empty under the vehicle inflates supporting the vessel in the water. The catamaran extensions ride a foot or more further in the water. The vessel is powered with the propellers to navigate inland waterways in a hydroplaning fashion. Steerage uses the airplane controls since the vessel is driven with the propellers. If needed trim tab controlled rudder units 50 could be placed on the rear end of both catamaran inflatables.

FIG. 15 shows instrument box for controlling a vehicle remotely. Controlling an unmanned vehicle requires a remote control panel with variable adjusters for speed, and each trim tab. It needs an on-off control of the pump and three setting positions for shaft drive forward, reverse and stop. These same functions are worked into the choices a person has flying, driving or sailing the electric vehicle with, respectively, the instrument panel and controls, the dash board, steering wheels and pedals, and the helm. One can employ simulators for controls putting the operator into the environment with video camera in the nose or direction controlled in a cockpit location to enable visual flight operations. Instrument flight conditions require clearances, which can be provided by air traffic control directly to simulator site or to operator. Instrument feedback as the compass, altimeter, and full control instrument arrays are commonly conveyed to simulators. This instrumentation is not covered in this patent but is in current practice.

FIG. 16 shows possible cockpit instrument panel, dashboard, and helm and operation control 71 designs for remote simulators and for manned vehicles in the air, land, and sea, and combined in a "duck," which can fly, float and fetch. FIG. 16a shows the cockpit with an on/off switch 87 for electric power, the mobile stick or wheel 73 controlling ailerons 51 in rotation or side to side motion rolling the plane left or right, the elevators 52 in pushing or pulling the stick for and away from you lowering or raising the nose of the aircraft, and the foot pedals, left and right balancing the rudder position 50 having the plane turn toward the foot exerting the new pressure change. These affect the ball indicator 76, compass 79 and altimeter 78 and airspeed indicator 77 so these instruments are included. The throttle 72 controls the timing of the Piezo nudges on the propeller shaft increasing or decreasing rotation rates, a push/pull device, the further in it is pushed, the faster the speed. Where more power is required, the prop pitch, a three-setting indicator switch 75, can be lowered and rotation speed increased. When ready to cruise, the prop pitch increased and rotation rate lowered to conserve power. Unique to this aircraft design, buoyancy controls 74 are needed to release Helium for take-off, and to pump it back into the gas bottle when wanting to increase maneuverability or loose altitude. An on/off toggle switch will open the Piezo valve to fill the air sack 61 with Helium. "On" opens it. When the Helium quantity in the sack is sufficient to meet the altitude desired, "off" switch setting closes the Piezo valve

69. A second toggle switch turns on the Piezo pump 65 to return the Helium to the compressed gas tank 66. Navigation equipment is optional depending on use of the vehicle. These same controls are required in the duck controls shown in FIG. 16*d*.

FIG. 16*b* shows the dashboard and controls for an electric land vehicle 28. To not confuse the duck pilot, motorcycle controls might be a best choice putting the accelerator in the twisting of the right handlebar 72, the clutch on the right side of the handlebars can adjust the number of Piezos used in forward drive, hand breaks 86 and steerage rotating the handlebars 73. Since the vehicle sounds more like a shaver than a Harley, at least the controls give some level of masculinity to the operation.

FIG. 16*c* shows the helm of an electric ship with the propeller speed throttle, or for multiple props, split throttle levels normally connected 72, the on/off switch 87, and the helm 73, which upon turning changes the charge on the rudder trim tab positive or negative to enable directional change. A toggle switch for buoyancy 74, when up, activates the 69 to fill the air sack 61 and down activates the Piezo pump 65 to pump out the air sack lowering the buoyancy. The center position holds the present buoyancy. In a submarine, the sack containing air is filled with water to cause the vessel to dive. The water is pumped out leaving air in the sack to rise towards the surface or break the surface. Relating this to the duck, FIG. 16*d*, were the duck a swamp skimmer type, the rudder trim would simultaneously turn both the aircraft rudder and any submerged rudders underwater. High mounted aircraft propellers would propel the duck riding high on the surface of the water with catamaran hull design. An alternative design would have both the airplane propellers and one or more water drive shafts. Since the Piezo engine drives are exceedingly lightweight, it would not preclude the aircraft flight to carry the electric marine Piezo engine, shaft and propeller. It would also have light land wheels with independent wheel drives for road travel and landings and docking ramp climbs.

FIG. 17 applies the Piezo pump 65 to the matrices of the wristband coding the speech sounds and voice pitch. The wristband is constructed of Power Plastic 60 holding sufficient power to drive the microphone, sound analyzer and the seventeen pumps, one for each code position, having a square, a nine unit matrix on one side of the wrist, and a two row, four column matrix on the other. The intake valve 62 of each Piezo pump 65 draws ambient air or water with a negative charge pulling material into the reservoir 66 as the round Piezo 16 takes a concave form. Then the positive charge deflects the Piezo 16, which snaps into a convex form blowing the air or water out a small tube 64 with exit valve 63 blowing or washing on the skin 39 to allow the wearer to locate the signal. The frequency of the signal varies to be proportional to voice pitch. As the code positions are inactive, the Piezo 16 lays planar with no charge applied.

FIG. 18 shows the matrices 62 and 64 in the speech presentation armband. The band is Power Plastic 60 with the matrices arranged as described with the Piezo pumps 65 at each location. Electronics of the speech sound and pitch analyzers and the microphone are also built into the wristband. Mouth forms are defined in matrix 64 and the sounds made each form are defined by the vowel column and consonant column of matrix 62. The sounds in English and some in Arabic are defined by code configuration.

Piezo discs have the capability to react to charge quickly at varying frequencies allowing the signal location and frequency to be clearly defined with minimal power usage. The air or water stimulation of the skin will not disturb the character of the skin through continued use keeping the sensory stimulation of continuing high quality on one position of the wrist. With normal use in the air, the wrist is cooled with the air movement between the wristband 6 and the skin 39.

These devices can be worn on both wrists for stereo hearing, adding depth perception for deaf people, and to give the option of having translations presented simultaneously as English on the left wrist and a second language on the right. One could learn to speak with the signal on the right arm giving verbal responses in conversation with a person only speaking the second language. Their comments, translated are presented on the left wrist, which the wearer understands when mastering tactile hearing. The value of this two-way translation conversational capability across languages should be useful. The system can support speech simulation using artificial speech to carry both translations for conversants. It also allows for a compact digital speech coding method that is language independent and speaker independent which can be recorded efficiently for preservation of comments, translations and conversations.

FIG. 19 shows Piezo units 1 digitizing sensor 98 output. Where only binary output is needed, one unit 91 is used with "off" and "on" being the two options. With four levels of response needed, two units 91 and 92 are employed, the first 91 responding to the lowest level of power measurement desired and the second 92 responding to double the lowest level. Piezo mounting 95 holds the Piezo units so when sensor output flows, each Piezo shorts out a specific wire 99, which transmits the hit to the signal generator. The camera circuitry is a continuation of Power Plastic 60 circuitry powering the wires 99 enabling higher signal levels emerging from camera image data than would be possible using the actual output of the sensors for the three colors in each pixel.

FIG. 20 illustrates greater signal range from sensor output. If eight levels of output are needed, a third Piezo 93 with double the capacity of the second Piezo 92 is included in series such that were the power output from the sensor, for example, Chlorophyll, which is excited by light in the red spectral area, were low, then only the first Piezo unit 91 would respond. If the signal is a bit stronger, only the second 92, then the first 91 and second 92 Piezo units respond. If stronger, the third 93 will respond and any further increments of power will activate first the first Piezo 91, then exclusively the second 92, and with more, both the first 91 and second 92 along with the third Piezo 93 give eight levels of sensory output from off through these seven active levels.

Applying this to three-sensor pixels, a tricolor video camera pixel, the resulting chromatic differentiation in color would be 512 colors. If a fourth Piezo unit 94 is added with double the charge requirement of the third Piezo 93, then there are sixteen scale units from off through the fifteenth output levels. The color spectrum in the camera signal allows 4,096-color television.

Each row of pixels has a set of wiring for each of the three colors for five pixel groups all powered by the Power Plastic base 60, or, a total for 4096 color images, four wires for the power levels times three colors times five pixels in the simultaneous block, which equals 60 power wires per row of pixels. This necessitates Nano manufacturing of camera chips.

Applying the signal with 4096 colors defined, displays with that number of color levels are enabled to display the 4,096-color images. This is high quality video or television imaging. This applies to micro or nano sized sensor circuitry for the camera and the same, depending on display size, for the display. With the digitizing Piezo units produced in nano-production, one might term the Piezo digitizer a MEM unit reacting to sensor output by shorting out wiring to digitize the signal defining light level at each of the three colors. Together the pixel units define images up to 60 times a second. With e3tv, the image is defined having in each of the twenty-five segments of the image 25 tricolor pixels in five by five squares reporting simultaneously requiring for a twelve million pixel image 105 lines of 180 squares per frame in twenty-five regions of the screen. This makes 60 frames per second motion images possible.

FIG. 21 illustrates the Piezo units 90 applied in the display where the sensor output for each color for each pixel has to be replicated in the display to display the image. On a base of Power Plastic 60, "hot" wiring 99 under the Piezo level such that the first Piezo 91 when charged connects the emitter 90 to a unit amount of power. The second Piezo 92 when charged connects the emitter 90 to double the amount of power. Both together gives three times the first 91. The third Piezo 93 when charged connects the emitter 90 to four times the power. With the first 91, the emitter has five times the unit 91 power. With the second 92 only, there is six times unit power; with both there is seven times unit power. Adding the fourth Piezo, when charged, contacting the wire 99 with eight times the power level, adding the other Piezos as described one can achieve 15 power levels plus off.

Color production produces black when all power is off, white when all three color pixels power is on maximum, and a range of greys as all three colors have equally charged Piezos defining sixteen colors. As the color charge varies among the three colors, the remaining 4080 colors are reproduced from the camera image in the frame rate the display can handle. Presenting the uncompressed digital television signal in this manner, activating the Piezo MEM units 1 with signal output, the brightness of the display can be adjusted by increasing or decreasing the power levels on the feed wires 99 releasing the power when contacted by the Piezo units 91, 92, 93, and 94 that feed into the emitters 90, each of three colors for every pixel in the display, being twelve million tricolor pixels for e3tv.

I claim:

1. A method to enable function of an electric or electronic mobile unit for vehicles flying or sailing on or in water that can electronically steer the vehicle by applying a piezo driven trim tab to rudders, ailerons, elevators and other position control surfaces changing the balance of the control surfaces and turning or changing the direction of the vehicle in motion by one or more of the following techniques:
   a. piezo snap to roll an axle or shaft bearing a means to propel the unit;
   b. piezo bending to enable steerage;
   c. piezo action to modify pitch or angle of attack of a component of a unit;
   d. piezo repeated flexing to pump liquid or air;
   e. piezo alternating and, as required, holding for the contact for a desired duration, to switch on or off the function of a circuit or circuit component;
   (f) permanently attaching the Piezo unit trim tab to the edge of the control surface furthest from the anchoring mechanism of the control surface of the vehicle or to the pilot controlled trim tab of the vehicle at its edge furthest from the anchoring or rotating mechanism,
   (g). wiring the Piezo unit to the electronic control such that when no power is applied, steerage is provided by the wheel or yoke or joystick, pedals, and motion of the yoke toward or away from the pilot, or other steering action; when positive charge is applied the Piezo control tabs moves one direction and when negative charge is applied, it moves the other direction, causing motion one way or the other counter the current position of the control surface,
   (h). activating the change of Piezo charge from none to positive or negative, or degrees thereof, can be included in the steerage mechanism, be operated via wheels or setting levers, or digitally operated by touchscreen or keyboard.

2. A method, according to claim 1, where a craft or vessel can be steered remotely by radio controls or other means, which adjusts the power of the Piezo trim tabs to steer, climb, and bank the unit.

3. A method, according to claim 2, where airliners and commercial vessels can have remote operating of the unit by safety officers or owners to counter hijackers or handle a unit when the pilot or captain is incapacitated in emergency circumstances.

* * * * *